United States Patent [19]

Coughlin et al.

[11] Patent Number: 4,472,545

[45] Date of Patent: Sep. 18, 1984

[54] LEATHER-LIKE ARTICLES MADE FROM CELLULOSIC FILLER LOADED ETHYLENE INTERPOLYMERS

[75] Inventors: Michael C. Coughlin; Timothy T. Schenck, both of Wilmington, Del.

[73] Assignee: E. I. Du Pont de Nemours and Company, Wilmington, Del.

[21] Appl. No.: 453,953

[22] Filed: Dec. 28, 1982

[51] Int. Cl.³ .......................... C08K 5/01; C08K 5/10; C08K 5/11; B32B 27/30
[52] U.S. Cl. ........................................ 524/13; 524/14; 524/15; 524/35; 524/425; 524/427; 524/433; 524/436; 524/445; 524/493; 524/522; 524/524; 428/95; 428/96; 428/904
[58] Field of Search ...................... 524/13, 14, 15, 35, 524/109, 322, 425, 427, 433, 436, 444, 445, 493, 522, 523, 524; 428/95, 96, 904

[56] References Cited

U.S. PATENT DOCUMENTS 4,379,190  4/1983  Schenck .............................. 524/14

Primary Examiner—John Kight, III
Assistant Examiner—Nathan M. Nutter

[57] ABSTRACT

Articles having leather-like appearance are obtained from compositions comprising 5–55% by weight of an ethylene interpolymer, such as ethylene/vinyl ester, ethylene/unsaturated mono- or dicarboxylic acids or esters of said unsaturated acids, ethylene/α-olefin copolymers, etc.; 1–15% by weight of at least one plasticizer selected from the group consisting of processing oils, epoxidized oils polyesters, polyethers and polyetheresters; 20–90% by weight of cellulosic filler or mixture of cellulosic filler and mineral filler; 0–10% by weight of at least one additive, such as organic acid, organic acid derivative and surface active agent; and 0–27.5% by weight of elastomeric polymer.

20 Claims, No Drawings

LEATHER-LIKE ARTICLES MADE FROM CELLULOSIC FILLER LOADED ETHYLENE INTERPOLYMERS

BACKGROUND OF THE INVENTION

1. Field of the Invention

This invention relates to leather-like articles and more specifically it relates to leather-like articles obtained from wood-filled ethylene interpolymers.

2. Description of the Prior Art

U.S. Pat. No. 4,191,798 discloses highly filled thermoplastic compositions useful as sound-deadening sheeting for automotive carpets consisting essentially of (a) from about 5–50% by weight of at least one copolymer of ethylene with at least one comonomer such as vinyl esters of saturated carboxylic acid, unsaturated mono- or dicarboxylic acids, and esters of the unsaturated mono- or dicarboxylic acids; (b) from about 2–15% by weight of processing oil; and (c) from about 50–90% by weight of filler, such as calcium carbonate and barium sulfate.

Stead et al., European Patent Application No. 13,089, discloses the use of blends of ethylene/propylene copolymers with 40% wood flour in laminates with cloth.

Yagi, Japanese Patent No. 79 92,613, discloses blends of atactic polypropylene with mixtures of calcium carbonate, ammonium phosphate and wood flour.

Nahano, et al., Japan Kokai No. 76 69,552, discloses blends containing 20–45% polyolefins, less than 50% powdered wood and less than 50% calcium carbonate.

Copending patent application Ser. No. 273,418, filed June 15, 1981, now U.S. Pat. No. 4,438,228, discloses filled thermoplastic compositions useful, for example, as sound-deadening sheeting for automotive carpet that are obtained by blending about 5–55% by weight of ethylene/α-olefin copolymer, the α-olefin containing from 4–10 carbon atoms; about 2–12% by weight of plasticizers selected from the group consisting of processing oils, epoxidized oils, polyesters, polyethers and polyetheresters; about 40–90% by weight of filler such as calcium carbonate, barium sulfate, hydrated alumina, clay, magnesium carbonate, calcium sulfate, silica, flyash, cement dust, wood flour, ground rice hulls and mixtures thereof; and optionally elastomeric polymers.

Copending patent application Ser. No. 273,419, filed June 15, 1981, now U.S. Pat. No. 4,403,007, discloses filled thermoplastic compositions useful, for example, as sound-deadening sheeting for automotive carpet that are obtained by blending about 5–55% by weight of an ethylene interpolymer, such as ethylene/vinyl acetate, ethylene/unsaturated mono- or dicarboxylic acid or esters of said unsaturated acids, etc.; about 1–15% by weight of a plasticizer selected from the group consisting of polyesters, polyethers, polyetheresters and combinations thereof with processing oil; about 40–90% by weight of filler, such as calcium carbonate, barium sulfate, hydrated alumina, clay, magnesium carbonate, calcium sulfate, silica, flyash, cement dust, wood flour, ground rice hulls and mixtures thereof; and optionally modifying resins, such as unvulcanized elastomeric polymers and certain other ethylene and propylene homo- and copolymers.

Copending patent application Ser. No. 273,420, filed June 15, 1981, now U.S. Pat. No. 4,379,190, discloses filled thermoplastic compositions useful as sound-deadening sheeting having improved tensile elongation obtained by blending about 5–60% by weight of a mixture of at least two copolymers of ethylene, having specified polar comonomer contents, about 40–90% by weight of filler, such as calcium carbonate, barium sulfate, hydrated alumina, clay, magnesium carbonate, calcium sulfate, silica, flyash, cement dust, wood flour, ground rice hulls and mixtures thereof; and 0–15% by weight of plasticizer selected from the group consisting of processing oils, polyesters, polyethers, and polyetheresters; and optionally modifying resins such as elastomeric polymers and certain other ethylene and propylene homo- and copolymers.

SUMMARY OF THE INVENTION

According to the present invention there is provided an article having leather-like appearance made of a composition comprising (a) from about 5 to about 55% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, esters of said unsaturated acids wherein the alcohol moiety has 1 to 8 carbon atoms, and α-olefins containing from 4 to 10 carbon atoms, the ethylene content of said copolymer being from about 40 to about 95% by weight, the comonomer content of said copolymer being from about 5 to about 60% by weight, and the melt index of said copolymer being from about 0.1 to about 150 g/10 min, provided that when said copolymer of ethylene is an ethylene/vinyl ester or ethylene/unsaturated mono- or dicarboxylic acid ester copolymer said copolymer can contain up to about 15% by weight of carbon monoxide or sulfur dioxide; (b) from 1 to about 15% by weight of at least one plasticizer selected from the group consisting of processing oils, epoxidized oils, polyesters, polyethers, and polyether esters; (c) from about 20 to about 90% by weight of cellulosic filler or mixture of cellulosic filler with mineral filler; (d) from 0 to about 10% by weight of at least one additive selected from the group consisting of organic acids, organic acid derivatives and surface active agents; and (e) from 0 to about 27.5% by weight of elastomeric polymer.

Further, according to the present invention there are provided extruded sheets or films and injection molded articles having leather-like appearance comprising the compositions of the present invention.

Still further provided according to the present invention there are laminated structures having leather-like appearance comprising at least one layer of the composition of the present invention bonded to rigid and/or flexible substrates.

DETAILED DESCRIPTION OF THE INVENTION

It was discovered that the use of cellulosic fillers, such as wood flour, in combination with certain plasticized ethylene interpolymers would result in compositions that can be fabricated into articles that are remarkably leather-like. The term "leather-like" refers to attributes of appearance, surface texture, and flexibility. In addition the compositions are readily fabricable using thermoplastic processing methods.

The ethylene copolymers suitable for the leather-like article of the present invention are copolymers with at least one comonomer selected from the group consisting of vinyl esters of saturated carboxylic acids where the acid moiety has up to 4 carbon atoms, unsaturated mono- or dicarboxylic acids of 3 to 5 carbon atoms, the salts of said unsaturated acids, and esters of said unsaturated acids wherein the alcohol moiety has 1 to 8 carbon atoms. Terpolymers of ethylene and the above comonomers are also suitable. Ionomers, which are the completely or partially neutralized copolymers of ethylene and the acids described above, are discussed in more detail in U.S. Pat. No. 3,264,272. In addition, terpolymers of ethylene/vinyl acetate/carbon monoxide, ethylene/normal butyl acrylate/carbon monoxide or ethylene/methyl acrylate/carbon monoxide containing up to about 15% by weight of carbon monoxide can also be employed. Preferred comonomers are the above specified vinyl esters of saturated carboxylic acids, and esters of unsaturated carboxylic acids.

The ethylene content of the copolymer is from about 40 to 95% by weight, preferably from about 45 to about 90% by weight and most preferably from about 60 to about 85% by weight. The comonomer content is from about 5 to 60% by weight, preferably from about 10 to about 55% by weight and most preferably from about 15 to about 40% by weight. Mixtures of two or more ethylene copolymers can be used in these blends in place of a single copolymer as long as the average values for the comonomer content will be within the above indicated range. In particular, mixtures as described and claimed in pending U.S. application Ser. No. 273,420, filed June 15, 1981 (Atty. Docket No. AD-5065B), the disclosure of which is hereby incorporated by reference, can be used in the practice of this invention.

Melt index of the copolymers is from about 0.1 to about 150 g/10 min, preferably from about 0.3 to about 50 g/10 min, and most preferably from about 0.7 to about 10 g/10 min.

In accordance with the above, suitable ethylene copolymers include ethylene/vinyl acetate, ethylene/acrylic acid and its ionomers, ethylene/methacrylic acid and its ionomers, ethylene/methyl acrylate, ethylene/ethyl acrylate, ethylene/isobutyl acrylate, ethylene/normal butyl acrylate, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate and ethylene/methyl acrylate/monoethyl maleate. Particularly suitable copolymers are ethylene/vinyl acetate, ethylene/ethyl acrylate, ethylene/methyl acrylate, ethylene/isobutyl acrylate, ethylene/normal butyl acrylate, and ethylene/methyl methacrylate copolymers.

Also suitable for the practice of the present invention are linear copolymers of ethylene with at least one α-olefin comonomer selected from the group consisting of α-olefins containing from four to ten carbon atoms. Preferably the comonomer contains from four to eight carbon atoms. The ethylene α-olefin copolymers of the composition of the present invention are typically manufactured at a synthesis pressure of less than 5000 psia using transition element catalysts. Processes suitable for manufacturing these copolymers are described in detail in U.S. Pat. No. 4,076,698 and U.S. Pat. No. 4,163,831.

The ethylene content of the copolymer is from about 75 to about 98% by weight, and the α-olefin comonomer content is from about 2 to about 25% by weight. The preferred ethylene and comonomer levels are from about 80 to about 96% by weight and from about 4 to about 20% by weight, respectively. A mixture of two or more ethylene copolymers can also be used in the blends of the present invention in place of a single copolymer, provided the α-olefin comonomer content of the mixture (expressed in weight %) is within the above-indicated range. The most preferred comonomer level is from about 6 weight percent to about 16 weight percent. In this range, blends exhibit a combination of tensile properties and flexibility useful in the practice of this invention. Stiffer blends can be obtained by reducing the comonomer content in the copolymer below about 6 weight percent. However, as comonomer content is reduced, elongation decreases and plasticizer compatibility problems might arise. Comonomer content above 16 weight percent results in blends which are less stiff and have lower tensile strength, while their elongation is increased.

Generally from about 5 to about 55% by weight of ethylene copolymer is employed in the leather-like article of the present invention. Preferably from about 10 to 50% by weight, and most preferably from about 15 to about 30% by weight of ethylene copolymer is employed.

The first group of plasticizer ingredient of the leather-like article of the present invention is known as process or processing oil. Three types of processing oils are known—paraffinic, aromatic and naphthenic. None of these is pure; the grades identify the major oil type present.

Processing oils are also subdivided by viscosity range. "Thin" oils can be as low as 100–500 SUS (Saybolt Universal Seconds) at 100° F. (38° C.). "Heavy" oils can be as high as 6000 SUS at 100° F. (38° C.). Processing oils, especially naphthenic and aromatic oils with viscosity of from about 100 to 6000 SUS at 100° F. (38° C.) are preferred.

In the selection of a process oil, other factors such as the type of oil selected and its viscosity must be considered. These are discussed in detail in U.S. Pat. No. 4,191,798, the disclosure of which is hereby incorporated by reference.

The second group of plasticizers that are effective in the practice of the present invention is the group comprising epoxidized oils such as epoxidized soybean oil and epoxidized linseed oil.

The third group of plasticizers that are effective are the polyesters, which, in general, are liquid condensation products of a polybasic acid and a polyol. The term "liquid" in the context of the present invention is used to mean pourable at room temperature. The acid component is most often a saturated aliphatic dibasic acid or an aromatic dibasic acid; adipic acid, azelaic acid, phthalic acid, sebacic acid, and glutaric acid, or mixtures thereof are commonly used. The polyol can be an aliphatic polyol or a polyoxyalkylene polyol, such as ethylene glycol, propylene glycol, 1,4- and 1,3-butane glycol, diethylene glycol, and polyethylene glycol. Preferred polyester compositions would consist of an acid component of which greater than 50% by weight are aliphatic dibasic acids, and a polyol component of aliphatic polyol or even more preferably aliphatic glycol. Most preferred compositions are based on adipic or azelaic acid, and propylene glycol or 1,3- or 1,4-butane glycol. The molecular weight of these plasticizers can vary from a low of a few hundred up to a high of about 10,000. The molecular weight of commercial products is seldom specified. Typically in the trade, the molecular weight range of the product is classified as low, medium, or high. The preferred range for purposes of this invention is that classified as medium.

Mixtures of polyesters with hydrocarbon oils are also effective plasticizers in the present invention. One objective of using such a mixture is to couple the high efficiency of the relatively high cost polyester with the low cost of the hydrocarbon oil. The cost/performance of a compound plasticized with such a mixture can be improved significantly for a given application because properties can be tailored more precisely, or filler levels can be increased.

A separate class of plasticizers, polyethers and polyether esters, are also effective plasticizers in the leather-like articles of the present invention. In general, polyethers are oligomers or polymers of alkylene oxides; polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid to form the ester. Fatty acids such as lauric and stearic acids are commonly used; the most common examples of these compounds are the mono- and diesters of polyethylene or polypropylene glycol. The molecular weight of polyethers may range up to those typical of high polymers.

Preferred polyether compositions in the practice of this invention are those consisting of the polyols based on random and/or block copolymers of ethylene oxides and propylene oxides. The copolymer polyols provide better performance in terms of efficiency in compounds of the present invention containing very high levels of filler.

Mixtures of the polyether or the polyether ester plasticizers with either a polyester plasticizer or a hydrocarbon processing oil can also be used in the practice of this invention. The advantage of polyether/polyester combination is the lower cost since the polyethers are cheaper than the polyesters. Combinations of polyether and processing oil are also cheaper because of the lower cost of the oil.

The amount of plasticizer, such as the process oil, present in the leather-like article of the present invention is from 1 to about 15% by weight, preferably from about 2 to about 12% by weight. Most preferably the amount of plasticizer is from about 3 to about 8% by weight.

The third essential ingredient of the leather-like article of the present invention is the filler. Suitable fillers are cellulosic fillers, such as soft and hard wood flours, wood fiber, sawdust, corn cob flour, ground rice hulls, and shell flours, such as peanut shell flour and walnut shell flour, and, optionally mixtures of these fillers with mineral fillers such as calcium carbonate, barium sulfate, hydrated alumina, clay, magnesium carbonate, calcium sulfate, silica, fly ash, and cement dust. Preferred fillers are the soft and hard wood flours, and their mixtures with the mineral fillers just listed.

The amount of filler present in the leather-like article of the present invention is from about 20 to about 90% by weight, preferably from about 45 to about 85% by weight and most preferably from about 45 to about 80% by weight.

In addition to the above ingredients the leather-like article of the present invention may also contain additional additives to obtain certain characteristics. Among such additives one can list organic acids of the proper type. Organic acids cover a wide range of saturated acid types, from $C_6$ monobasic saturated carboxylic acids such as caproic to long-chain types such as $C_{22}$ (behenic). Fatty acids are highly effective in enhancing elongation and in increasing melt index at very low concentrations. A concomitant decrease in blend stiffness is generally also attained. In addition to monomeric organic acids, the so-called "dimer" and "trimer" acids (dimers and trimers of the simpler straight-chain forms) having up to 54 carbon atoms are also highly effective. Mixtures of the above-mentioned acids may be employed, as may mixtures of any of the acid types disclosed therein.

In addition to the acids listed above, saturated polybasic acids are also effective. In this instance, when an acid such as azelaic acid ($C_9$, saturated, dibasic; $HOOC.(CH_2)_7.COOH$) is employed, the elongation values for blends will be markedly improved, the stiffness will be reduced, but the melt index will be virtually unchanged.

Further, mono- or polyunsaturated organic acids, including the $C_{12}$—$C_{20}$ mono- and dicarboxylic acids, and, in particular, oleic acid (monounsaturated $C_{18}$-type fatty acid) are also highly effective.

Cycloalkyl and aromatic carboxylic acids are also effective in the practice of this invention.

Mono-, di- and trivalent metal salts of organic acids, in particular the calcium and zinc salts of fatty acids, are very effective. Esters and amides of the organic acids are also effective.

The number of organic acids in existence is enormous; the examples named above can be replaced by other close analogs with good results and without departing from the spirit of this invention.

A more detailed description of the organic acids that are suitable for use in the present invention can be found in copending patent application Ser. No. 339,468, filed on Jan. 15, 1982, now U.S. Pat. No. 4,434,258 (Docket No. AD-5199), the disclosure of which is hereby incorporated by reference.

Another group of additives that can be employed in the leather-like article of the present invention are surface active agents of the proper type. These will produce a large increase in the tensile elongation value of the leather-like article.

Surfactants which are effective are those which are selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin sulfonates, sulfosuccinates, sulfonated fatty acid esters, sulfonates of ethoxylated alkyl phenols and of oils and of fatty acids, naphthalene and alkyl naphthalene sulfonates, condensed naphthalene sulfonates, petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts thereof; phosphate derivatives comprising phosphate esters, phosphate alcohol ethoxylates, phosphate ether ethoxylates, phosphate alkyl acids and phosphate alkyl quaternaries; and quaternary surfactants.

The number of surfactants in existence is enormous; the examples named above can be replaced by other close analogs with good results and without departing from the spirit of this invention.

A more detailed description of the surface active agents suitable for use can be found in copending patent application Ser. No. 400,243, now U.S. Pat. No. 4,430,468 filed July 21, 1982 (Docket No. AD-5201), the disclosure of which is hereby incorporated by reference.

The amount of the additive, such as the organic acid or surfactant will generally range from 0 to about 10% by weight.

Unvulcanized elastomeric polymers are of interest as modifying resins for the leather-like articles of the present invention. They exhibit good compatibility and can be useful for obtaining increased flexibility and/or melt strength. When these polymers are used in combination with the ethylene copolymers described previously, they can range in concentration from 0 to about 27.5% by weight, preferably up to about 22.5% by weight, and most preferably up to about 12% by weight of the composition of the present invention. A variety of different rubbers can be used including styrene-butadiene rubber, polyisobutylene, ethylene/propylene rubbers, and terpolymers of ethylene, propylene, and a diene monomer (EPDM). Preferred rubbers are the ethylene/propylene and the EPDM polymers in which the ethylene content can range from above 20% by weight to about 80% by weight. The diene comonomer is usually methylene norbornene, ethylidene norbornene, dicyclopentadiene, or 1,4-hexadiene, although other dienes may be used, and the concentration of the diene is usually less than 5% by weight. The Mooney viscosity is preferably in the range of 20 to 90.

Polymers, both homo- and copolymers, other than the ones referred to above, can also be used to some extent in combination with the above-specified polymers without significantly interfering with the advantages obtained by the present invention. These include, but without limitation, polymers such as ethylene/carbon monoxide and ethylene/sulfur dioxide. Similarly other ingredients can also be added to the leather-like article of the present invention by a compounder in order to obtain some desired effect, such as reduction of cost, or enhancement of a physical property. Accordingly, extender resins, waxes, foaming agents, crosslinking agents, antioxidants, etc. that are widely used, can be included in the leather-like articles of the present invention. Deodorants and/or perfumes can also be included in the leather-like articles of the present invention in order to obtain a desired odor, e.g. leather odor.

Commercially size bath-type blenders such as a Banbury or equivalent intensive mixer are entirely suitable for blending the ingredients of the present invention. Continuous mixing devices such as a Farrell Continuous mixer ("FCM") or a twin screw extruder are also excellent. With either type of unit, dry ingredients are charged in routine fashion. It is convenient in most cases to inject the plasticizer component directly into the mixing chamber of either unit as per widely used practice with these types of equipment. When more than one plasticizer is used, and where any one of the plasticizers is present in a small amount (less than about 10 weight percent of the total plasticizer mixture), the plasticizers should be preblended before addition to the other ingredients of the present invention. This will facilitate uniform distribution of each plasticizer component in the final composition and thus ensure that optimum properties are obtained. Similarly, since the amount of organic acid employed generally is so small, less than 1% for many cases, it is important to be certain that the organic acid is thoroughly mixed into he final blend. If this is not done, highly erratic values for physical properties may result. Thus, it may often prove helpful to premix the organic acid into a portion of one of the other ingredients, e.g., a liquid organic acid may be premixed with the process oil or a solid organic acid may be premixed with an aliquot of the filler. If desired, the copolymer and the plasticizer(s) can be precompounded as a "Masterbatch" in a suitable intensive mixing device (e.g., Banbury mixer or screw extruder). This "Masterbatch" can then be compounded with the filler and the other remaining ingredients to produce the final composition. A mix cycle of about 3 minutes is generally adequate for a Banbury mixer at an operating temperature usually between 325° and 375° F. The operating rate for an FCM unit generally will fall within ranges predicted by literature prepared by the Farrel Company, Ansonia, Conn. Here, temperatures between 325° and 425° F. are effective. In both cases, a very low plasticizer level, say about 2–3%, may require higher temperatures, while plasticizer levels above about 7% may mix well at lower mixer temperatures.

Generally, changes in the sequence of addition of ingredients has not been found to be significant, provided that the final mixture is thoroughly fluxed to attain homogeneity.

Once the ingredients are mixed, routine commercial practices may be used, such as underwater melt cutting plus drying or use of sheeting plus chopping methods, to obtain a pelletized product. The mixture, either as a pellet or as the hot mixture direct from the compounding device, can be formed into useful articles by a variety of methods. For example sheet or film can be extruded or calendered, and then die cut and fabricated into items such as purses and handbags. These blends can also be extrusion coated onto woven or nonwoven fabric substrates to produce laminated structures useful as upholstery material, wall coverings and luggage. Laminated structures, wherein at least one layer of the leather-like composition of the present invention is bonded to rigid and/or flexible substrates can also be obtained. Such substrates can e.g. be selected from the group consisting of woven and nonwoven fabrics, scrim, wood, composite board and thermoplastic and thermosetting resins. Other items such as holsters and belts can be injection molded. The surface texture of the articles formed can be varied according to how the materials are processed. For example, a rough, almost napped surface like unprocessed natural leather hide can be produced by simply passing the molten mixture through a two roll mill. A smooth surface, like that obtained with processed leather goods, can be formed by injection molding or extrusion over polished casting rolls.

Other aesthetic features are influenced by the composition. Using the preferred wood flour fillers for example, the color of the finished article can be varied from light tan to a dark brown much like natural leather. Hard, stiff materials result when for example a mixture of linear high density polyethylene and an ethylene vinyl acetate copolymer, according to the specification set forth above, is used as the polymer component. Conversely, a soft, very flexible material can be produced when for example an ethylene/vinyl acetate copolymer is used alone as the polymer component.

The Examples which follow are given for the purpose of illustrating the present invention. All parts and percentages are by weight unless otherwise specified.

EXAMPLES 1-6

Compositions and physical properties are summarized in Table 1. All compounds were prepared in a Banbury mixer. All of the ingredients were first charged into the chamber in an amount adequate to fill the entire chamber. The chamber was then closed using a ram pressure of 25 psi. The ingredients were mixed for about 7 min. at a rotor speed which was continuously adjusted to maintain a temperature of 180°-185° C.

The compounds of Table I could be sheeted out on a two-roll mill after blending to give sheets with a rough texture of certain leather goods. Compression molded or injection molded samples had the smooth texture of tanned leather articles. All examples possessed the hand and drape of leather.

Based on flexural modulus and tensile elongation data, formulations containing the polyester oil would be preferred.

TABLE I

| | Ex. 1 | Ex. 2 | Ex. 3 | Ex. 4 | Ex. 5 | Ex. 6 |
|---|---|---|---|---|---|---|
| Ingredients | | | | | | |
| EVA[1] | 35 | 24 | 24 | 35 | 35 | 33 |
| "Plastolein" 9776[2] | 5 | 6 | 6 | — | — | 7 |
| "Circosol" 4240[3], % | — | — | — | 5 | 4.67 | — |
| Stearic Acid, % | — | — | — | — | 0.33 | — |
| #9 Whiting[4], % | — | 20 | 40 | — | — | — |
| Wood Flour[5], % | 60 | 50 | 30 | 60 | 60 | — |
| Corn Cob Flour[6], | — | — | — | — | — | 60 |
| Physical Properties | | | | | | |
| Density, g/cc | 1.16 | 1.30 | 1.45 | 1.16 | 1.17 | 1.17 |
| Tensile Strength[7], | | | | | | |
| MPa, | 1.9 | 1.4 | 1.6 | 3.7 | 3.8 | 1.5 |
| psi, | 275 | 196 | 238 | 540 | 553 | 218 |
| Tensile Elongation[7], % | 251 | 57 | 194 | 11 | 11 | 251 |
| Flexural Modulus[8] | | | | | | |
| MPa, | 114.4 | 136.5 | 11.51 | 279.2 | 381.3 | 9.03 |
| Kpsi, | 16.6 | 19.8 | 16.7 | 40.5 | 55.3 | 13.1 |
| Crease Test[9] | P | P− | P | P− | P− | P |

Footnotes for Table I
[1]EVA copolymer: 18% vinyl acetate, 82% ethylene; 2.5 MI
[2]"Plastolein" 9776: polyester oil plasticizer, Emery Industries, Inc.
[3]"Circosol" 4240: Naphthenic processing oil; viscosity 2525 Saybolt Universal Seconds at 100° F.; Sun Oil Co.
[4]#9 Whiting: calcium carbonate; Georgia Marble Co.
[5]Wood flour: Wilner #139 wood flour; Wilner Wood Products Co.
[6]Corn cob flour: COB DRI #100; Frank Miller and Sons, Inc.
[7]ASTM D1708, 2 inches/min; 0.050" (1.27 mm) nominal compression molded plaque.
[8]ASTM D790, 0.2 inches/min; 0.050" (1.27 mm) nominal compression molded plaque.
[9]Dead-bend crease: sample (0.025" (0.64 mm) nominal compression molded plaque) is folded sharply back upon itself (dead-bend). P = Pass, P− = slight cracking at the fold edge.

We claim:

1. An article having leather-like appearance made of a composition comprising (a) from about 15 to about 55% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, and esters of said unsaturated acids wherein the alcohol moiety has 1 to 8 carbon atoms, and α-olefins containing from 4 to 10 carbon atoms, the ethylene content of said copolymer being from about 40 to about 95% by weight, the comonomer content of said copolymer being from about 5 to about 60% by weight, and the melt index of said copolymer being from about 0.1 to about 150 g/10 min, provided that when said copolymer of ethylene is an ethylene/vinyl ester or ethylene/unsaturated mono- or dicarboxylic acid ester copolymer said copolymer can contain up to about 15% by weight of carbon monoxide; (b) from 1 to about 15% by weight of at least one plasticizer selected from the group consisting of processing oils, epoxidized oils, polyesters, polyethers, and polyether esters; (c) from about 20 to about 70% by weight of cellulosic filler; (d) from 0 to about 10% by weight of at least one additive selected from the group consisting of organic acids, organic acid derivatives and surface active agents; and (e) from 0 to about 27.5% by weight of elastomeric polymer.

2. The leather-like article of claim 1 wherein said cellulosic filler is selected from the group consisting of soft- and hardwood floors, wood fiber, sawdust, corn cob flour, ground rice hulls, and shell flours.

3. The leather-like article of claim 2 wherein (a) said copolymer of ethylene is present in an amount of from about 15 to about 50% by weight, the ethylene content of said copolymer being from about 45 to about 90% by weight, the comonomer content of said copolymer being from about 10 to about 55% by weight and the melt index of said copolymer being from about 0.3 to about 50 g/10 min; (b) said plasticizer is present in an amount of from about 2 to about 12% by weight; (c) said filler is present in an amount of from about 45 to about 70% by weight; and (e) said elastomeric polymer is present in an amount of up to about 22.5% by weight.

4. The leather-like article of claim 3 wherein said copolymer of ethylene is selected from the group consisting of ethylene/vinyl acetate, ethylene/acrylic acid, ethylene/methacrylic acid, ethylene/methyl acrylate, ethylene/ethyl acrylate, ethylene/isobutyl acrylate, ethylene/normal butyl acrylate, ethylene/isobutyl acrylate/methacrylic acid, ethylene/normal butyl acrylate/methacrylic acid, ethylene/isobutyl acrylate/acrylic acid, ethylene/normal butyl acrylate/acrylic acid, ethylene/methyl methacrylate, ethylene/vinyl acetate/methacrylic acid, ethylene/vinyl acetate/acrylic acid, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate, ethylene/methyl acrylate/monoethyl maleate, ethylene/butene and ethylene/octene.

5. The leather-like article of claim 4 wherein said filler is selected from the group consisting of soft and hard wood flours.

6. The leather-like article of claim 5, wherein (a) said copolymer of ethylene is present in an amount of from about 15 to about 30% by weight; the ethylene content of said copolymer being from about 60 to about 85% by weight, the comonomer content of said copolymer being from about 15 to about 40% by weight, and the melt index of said copolymer being from about 0.7 to about 10 g/min; (b) said plasticizer is present in an amount of from about 3 to about 8% by weight; and (e) said elastomeric polymer is present in an amount of up to about 12% by weight.

7. The leather-like article of claim 6 wherein said copolymer of ethylene is selected from the group consisting of ethylene/vinyl acetate, ethylene/ethyl acrylate, ethylene/methyl acrylate, ethylene/isobutyl acrylate, ethylene/normal butyl acrylate and ethylene/methyl methacrylate.

8. The leather-like article of claim 1 in the form of extruded sheet or film.

9. The leather-like article of claim 4 in the form of extruded sheet or film.

10. The leather-like article of claim 5 in the form of extruded sheet or film.

11. The leather-like article of claim 7 in the form of extruded sheet or film.

12. A laminated structure having leather-like appearance comprising at least one layer of the composition defined in claim 1 bonded to rigid and/or flexible substrate.

13. The laminated structure of claim 12 wherein said substrate is selected from the group consisting of woven and nonwoven fabrics, scrim, wood, composite board and thermoplastic and thermosetting resins.

14. A laminated structure having leatherlike appearance comprising at least one layer of the composition defined in claim 4 bonded to rigid and/or flexible substrate wherein said substrate is selected from the group consisting of woven and nonwoven fabrics, scrim, wood, composite board and thermoplastic and thermosetting resins.

15. A laminated structure having leatherlike appearance comprising at least one layer of the composition defined in claim 5 bonded to rigid and/or flexible substrate wherein said substrate is selected from the group consisting of woven and nonwoven fabrics, scrim, wood, composite board and thermoplastic and thermosetting resins.

16. A laminated structure having leatherlike appearance comprising at least one layer of the composition defined in claim 7 bonded to rigid and/or flexible substrate wherein said substrate is selected from the group consisting of woven and nonwoven fabrics, scrim, wood, composite board and thermoplastic and thermosetting resins.

17. The leather-like article of claim 1 in the form of injection molded article.

18. The leather-like article of claim 4 in the form of injection molded article.

19. The leather-like article of claim 5 in the form of injection molded article.

20. The leather-like article of claim 7 in the form of injection molded article.

* * * * *